(12) United States Patent
Ichimura et al.

(10) Patent No.: US 7,321,429 B2
(45) Date of Patent: Jan. 22, 2008

(54) MICROSCOPE USING QUANTUM-MECHANICALLY ENTANGLED PHOTONS

(75) Inventors: Kouichi Ichimura, Yokohama (JP); Kenji Ohkuma, Yokohama (JP); Mikio Fujii, Kawasaki (JP); Hayato Goto, Kawasaki (JP); Kentaro Torii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 252 days.

(21) Appl. No.: 11/054,441

(22) Filed: Feb. 10, 2005

(65) Prior Publication Data

US 2005/0213107 A1    Sep. 29, 2005

(30) Foreign Application Priority Data

Feb. 12, 2004    (JP) .............................. 2004-035401

(51) Int. Cl.
*G01B 9/02*    (2006.01)
(52) U.S. Cl. ...................................... 356/484; 356/317
(58) Field of Classification Search ............... 356/450, 356/384, 317, 318
See application file for complete search history.

(56) References Cited

U.S. PATENT DOCUMENTS

| | | | |
|---|---|---|---|
| 5,796,477 A * | 8/1998 | Teich et al. ................. 356/318 |
| 6,567,164 B2 * | 5/2003 | Birk et al. ................... 356/317 |
| 6,714,294 B1 * | 3/2004 | Bruce et al. ............. 356/237.1 |
| 6,961,124 B2 * | 11/2005 | Engelhardt et al. ......... 356/417 |
| 2002/0093632 A1 * | 7/2002 | Teich et al. ................... 355/18 |
| 2002/0180965 A1 * | 12/2002 | Engelhardt et al. ......... 356/318 |
| 2003/0098979 A1 * | 5/2003 | Dress et al. ................. 356/484 |
| 2003/0098980 A1 * | 5/2003 | Dress et al. ................. 356/484 |

OTHER PUBLICATIONS

Malvin C. Teich, et al., "Entangled-Photon Microscopy", Ćeskoslovensky Ćasopis Pro Fyziku 47, 1997, pp. 3-8.
Milena D'Angelo, et al., "Two-Photon Diffraction and Quantum Lithography", Physical Review Letters, The American Physical Society, vol. 87, No. 1, Jul. 2, 2001, pp. 013602-1-013602-4.

* cited by examiner

*Primary Examiner*—Hwa (Andrew) Lee
(74) *Attorney, Agent, or Firm*—Oblon, Spivak, McClelland, Maier & Neustadt, P.C.

(57) ABSTRACT

A microscope includes a photon source which sequentially generates sets of quantum-mechanically entangled photons including at least two photons, a lens which focuses a set of photons, an actuator which varies a relative distance between a focal position of the lens and a specimen with a minute displacement, a detector detecting photons transmitted through or scattered by the specimen, and a counter counting coincidence detections of n-numbers of photons with the detector during a gating time which is set so that a rate that a number of photons detected during thereof belong to a single set of quantum-mechanically entangled photons exceeds a predetermined rate depending on the varied relative distance.

17 Claims, 5 Drawing Sheets

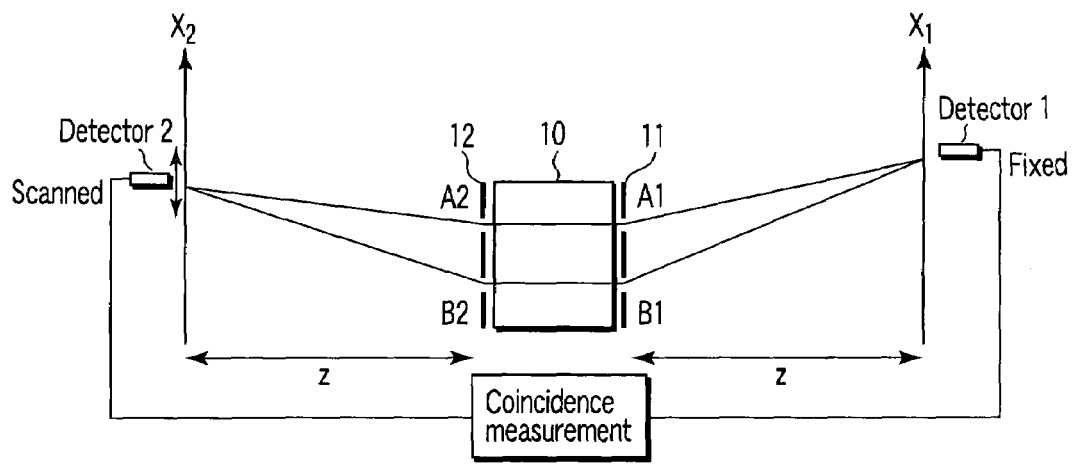
F I G. 3A
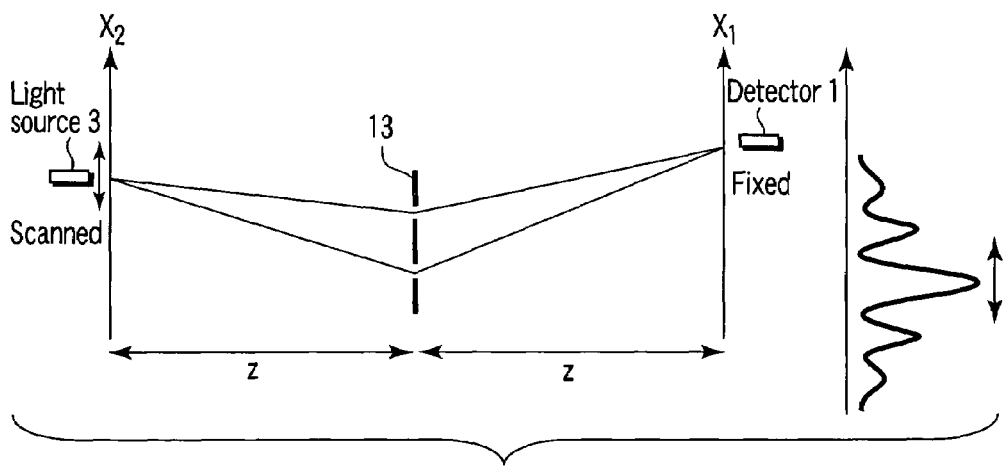
F I G. 3B
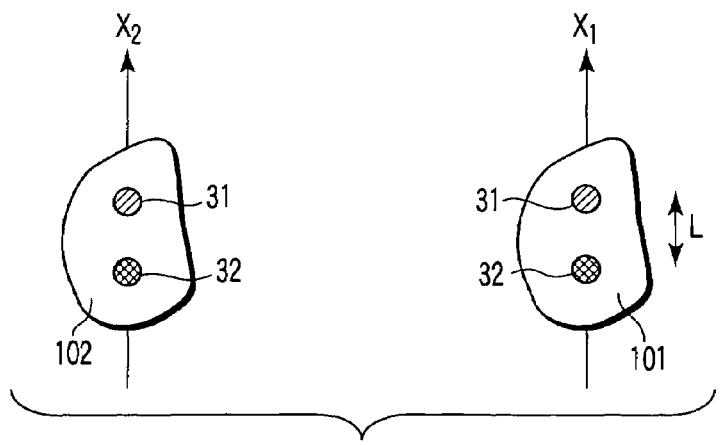
F I G. 4

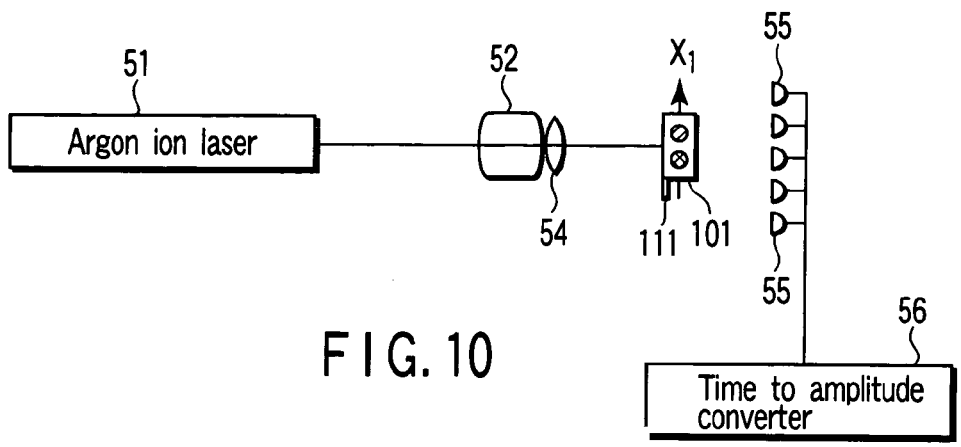
F I G. 10
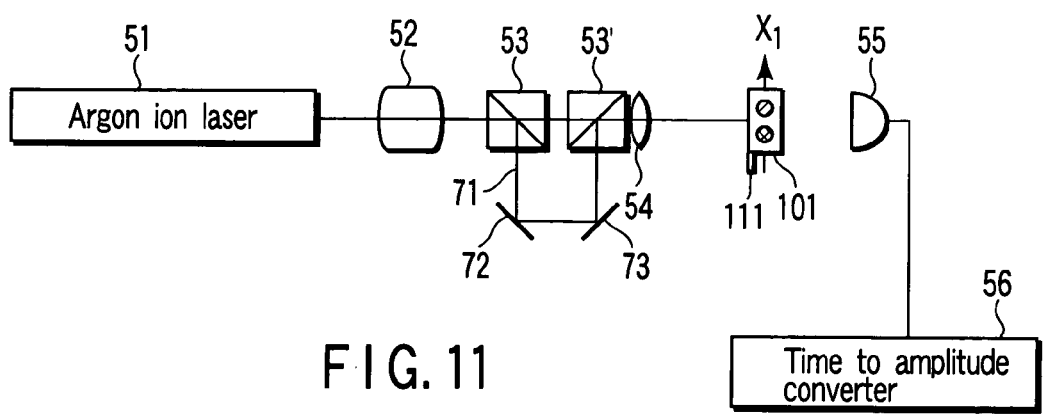
F I G. 11
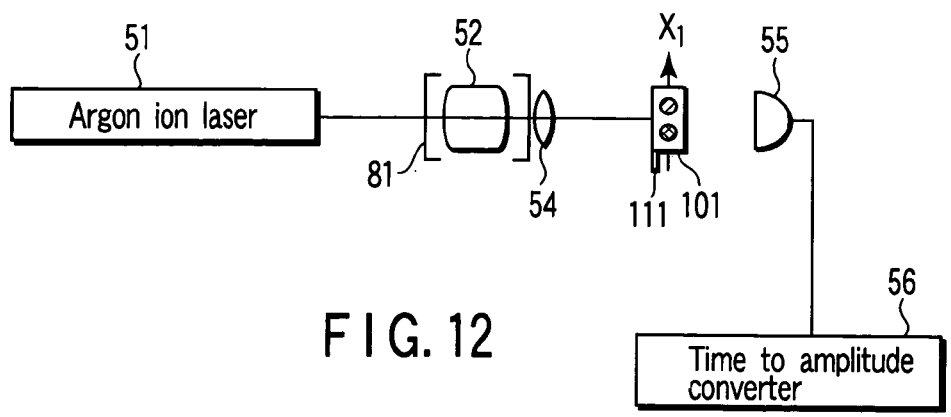
F I G. 12

MICROSCOPE USING QUANTUM-MECHANICALLY ENTANGLED PHOTONS

CROSS-REFERENCE TO RELATED APPLICATIONS

This application is based upon and claims the benefit of priority from prior Japanese Patent Application No. 2004-035401, filed Feb. 12, 2004, the entire contents of which are incorporated herein by reference.

BACKGROUND OF THE INVENTION

1. Field of the Invention

The present invention relates to a microscope providing high resolution even when visible light is used without using short wavelength light such as ultraviolet light, and providing many choices on observable specimens.

2. Description of the Related Art

Optical microscopes have excellent advantages that they need not be in contact with a specimen, do not require the specimen to be conductive, and enable structural analysis using the dependence of an optical response (absorption, scattering, emission, or the like) from the specimen on a wavelength. However, the optical microscopes have a serious disadvantage that the spatial resolution thereof is substantially limited to the wavelength $\lambda$ of light.

Conventionally, the following two methods are known to improve the resolution of the optical microscope: (1) use of light of a short wavelength and (2) use of multiphoton absorption. However, the method (1) is disadvantageous in that light of wavelength shorter than 200 nm does not propagate though the air and in that an optical element (lens, prism, and the like) using transmission or refraction cannot be used at a wavelength shorter than 105 nm. Thus, if the resolution is to be improved using light of a short wavelength, the wavelength is limited to about 100 to 200 nm. Further, with the method (2), the specimen must have energy levels which are markedly resonant with n-photon absorption. Consequently, the specimen is extremely limited. In other words, it is difficult to achieve spatial resolution significantly exceeding the wavelength limit.

In recent years, a proposal has been made to improve the spatial resolution of observations using multiple photons in a quantum-mechanically entangled state (see M. C. Teich and B. E. A. Saleh; Ces. cas. fyz., 47(1997) 3-8). However, because this proposal uses the multi-photon absorption of the specimen, it produces problems similar to those with the method (2).

Thus, the conventional methods proposed to improve the resolution of the optical microscopes are disadvantageous in that they have difficulty in greatly improving the resolution without limiting the observable specimens. No practical methods have been known which solve these problems.

BRIEF SUMMARY OF THE INVENTION

According to an aspect of the present invention, there is provided a microscope using quantum-mechanically entangled photons comprising: a photon source which sequentially generates sets of quantum-mechanically entangled photons including at least two photons i, where i is an integer between 1 and n, n being an integer equal to or larger than 2; a splitter splitting the quantum-mechanically entangled photons into individual photons i traveling in different directions; lenses i which focus the individual photons i, respectively; actuators which vary relative distances i between focal positions i of the respective lenses i on which the individual photons are focused and n-numbers of specimens i having a same structure with a minute displacement, respectively, the n-numbers of specimens i being arranged near the focal positions of the respective lenses i; detectors i detecting a photon transmitted through or scattered by the specimens i, respectively; and a counter counting coincidence detections of the photons with the detectors i depending on the varied relative distances i.

According to another aspect of the present invention, there is provided a microscope using quantum-mechanically entangled photons comprising: a photon source which sequentially generates sets of quantum-mechanically entangled photons including at least two photons i, where i is an integer between 1 and n, n being an integer equal to or larger than 2; a lens which focuses a set of photons; an actuator which varies a relative distance between a focal position of the lens on which the set of photons are focused and a specimen with a minute displacement, the specimen being arranged near the focal position of the lens; a detector detecting photons transmitted through or scattered by the specimen; and a counter counting coincidence detections of n-numbers of photons with the detector during a gating time which is set so that a rate that a number of photons detected during thereof belong to a single set of quantum-mechanically entangled photons exceeds a predetermined rate depending on the varied relative distance.

BRIEF DESCRIPTION OF THE SEVERAL VIEWS OF THE DRAWING

FIGS. 3A and 3B are schematic diagrams illustrating the meaning of coincidence measurement of photon pairs coupled with entanglement in a mechanism of another microscope according to an embodiment of the present invention;

FIG. 4 is a diagram showing the relationship between the orientations of specimens and directions to which the specimens are scanned;

FIG. 10 is a schematic view showing the microscope according to Example 3 of the present invention;

FIG. 11 is a schematic view showing the microscope according to Example 4 of the present invention; and FIG. 12 is a schematic view showing the microscope according to Example 5 of the present invention.

DETAILED DESCRIPTION OF THE INVENTION

First, the operational principle of a microscope according to an embodiment of the present invention will be described below.

The microscope according to the embodiment of the present invention utilizes the interesting nature of entanglement. That is, when n-numbers of photons of wavelength λ coupled with entanglement are caused to interact with a specimen and then the photons are separately measured and correlated with each other, such behavior as if the specimen were measured using photons of wavelength λ/n will be observed. Taking the case where n equals to 2, i.e., the case of two photons coupled with entanglement as an example for simplification, the mechanism of the behavior as if the observation wavelength is shortened will be described in detail.

Figure 1:
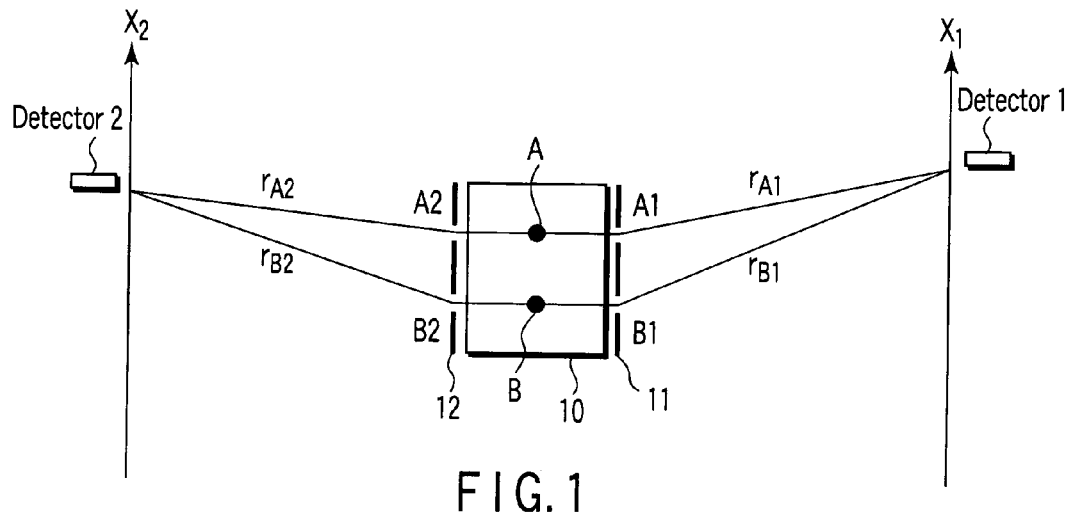
FIG. 1 is a schematic diagram illustrating the principle of coincidence measurement of photon pairs coupled with entanglement in a microscope according to an embodiment of the present invention.

As shown in FIG. 1, assume that each of a pair of photons coupled with entanglement (hereinafter referred to as an entangled photon pair) is caused to pass through a double slit and then detected at a sufficiently distant position. M. D'Angelo et al. has studied such a situation and proposed an application of entangled photons to lithography for fine processing (M. D'Angelo et. al., Phys. Rev. Lett., 87(1), 013602(2001)).

As shown in FIG. 1, double slits 11 and 12 are arranged on the both sides of a nonlinear crystal 10. Photon detectors 1 and 2 are arranged sufficiently away from the double slits 11 and 12, respectively.

In this case, the nonlinear crystal 10 is used for parametric down-conversion. When the nonlinear crystal 10 is irradiated with a pump beam, entangled photon pairs are generated. In FIG. 1, two points where the entangled photon pair is generated are depicted as points A and B. The photons passing through slits A1 and A2 of the double slits 11 and 12 is generated at the point A in the nonlinear crystal 10. The two photons of the photon pair generated at the point A do not pass through the slits B1 and B2. Similarly, the photons passing through slits B1 and B2 of the double slits 11 and 12 is generated at the point B in the nonlinear crystal 10. The two photons of the photon pair generated at the point B do not pass through the slits A1 and A2. However, one of the two photons constituting the photon pair generated at the point A may pass through the slit B1 or B2, or one of the two photons constituting the photon pair generated at the point B may pass through the slit A1 or A2.

This is because the entangled photon pair generated through the parametric down-conversion is expressed as follows:

$$|\Psi\rangle = \sum_{s,i} F(\omega_s, \omega_i, \vec{k}_s, \vec{k}_i) a_{0s}{}^+ [\omega(\vec{k}_s)] a_{0i}{}^+ [\omega(\vec{k}_i)] |0\rangle, \quad (1)$$

$$F(\omega_s, \omega_i, \vec{k}_s, \vec{k}_i) \propto \delta(\omega_s + \omega_i - \omega_p) \times \delta(\vec{k}_s + \vec{k}_i - \vec{k}_p), \quad (2)$$

where $\omega_l$ and $\vec{k}_l$ (l=s, i, p) denote the angular frequency and wave vector of an entangled photon pair and of pump beam by which the photon pair is generated. One of the pair of photons is called a signal beam and denoted using a subscript s. The other is called an idler beam and denoted using a subscript i. Further, $a_{0s}{}^+$ and $a_{0i}{}^+$ denote creation operators for the signal beam and the idler beam, respectively. The pump beam is denoted using a subscript p. As shown in the formulas (1) and (2), there are strong correlations $\omega_s + \omega_i = \omega_p$ and $\vec{k}_s + \vec{k}_i = \vec{k}_p$ between the angular frequencies $\omega_s$ and $\omega_i$ and wave vectors $\vec{k}_s$ and $\vec{k}_i$ of a photon pair generated. Accordingly, photons generated at the point (A) where such a pair of photons each passing through the slits A1 and A2 has been generated do not pass through the slits B1 and B2. This also applies to photons generated at the point (B) where such a pair of photons each passing through the slits B1 and B2.

The photons of the entangled photon pair are detected at the positions of the detectors 1 and 2, which are at an equal distance Z from the double slits 11 and 12, respectively. If the photons are counted under coincidence measurement, then the results shown below are obtained.

The probability of the coincidence measurement with the detectors 1 and 2 is expressed by the formula (3):

$$P_{12} = \langle \Psi_d | E_1^{(-)} E_2^{(-)} E_2^{(+)} E_1^{(+)} | \Psi_d \rangle = |\langle 0 | E_2^{(+)} E_1^{(+)} | \Psi_d \rangle|^2, \quad (3)$$

where $E_1^{(\pm)}$ and $E_2^{(\pm)}$ denote fields generated by the photons in the detectors 1 and 2, respectively, and are expressed as follows:

$$E_1^{(+)} = a_s \exp(ikr_{A1}) + b_s \exp(ikr_{B1}), \quad (4)$$

$$E_2^{(+)} = a_i \exp(ikr_{A2}) + b_i \exp(ikr_{B2}), \quad (5)$$

where $E_1^{(-)}$ and $E_2^{(-)}$ are Hermitian conjugates of $E_2^{(+)}$ and $E_1^{(+)}$.

In these formulas, $r_{Am}$ and $r_{Bm}$ denote optical path lengths between a detector m and the points A and B where the photon pairs are generated. Further, $a_s$ and $a_i$ denote annihilation operators for the photon pair passing through the slits A1 and A2, and $b_s$ and $b_i$ denote annihilation operators for the photon pair passing through the slits B1 and B2. Furthermore, $\langle \Psi_d |$ denotes photons having passed through the slits and can be expressed in the form of superposition of the photon pair passing through the slits A1 and A2 and the photon pair passing through the slits B1 and B2 as in the formula (6):

$$\langle \Psi_d | = |0\rangle + \epsilon [a_s{}^+ a_i{}^+ \exp(i\phi_A) + b_s{}^+ b_i{}^+ \exp(i\phi_B)] |0\rangle. \quad (6)$$

In this formula, $a_s{}^+$ and $a_i{}^+$ denote creation operators for the photon pair passing through the slits A1 and A2, and $b_s{}^+$ and $b_i{}^+$ denote creation operators for the photon pair passing through the slits B1 and B2. Thus, the probability $P_{12}$ of the coincidence measurement is calculated as follows:

$$P_{12} \propto 1 + \cos \{k(r_A - r_B)\}. \quad (7)$$

It should be noted that $r_A = r_{A1} + r_{A2}$ and $r_B = r_{B1} + r_{B2}$. That is, $r_A$ denotes the optical path length joining the detector 2, the slit A2, the slit A1, and the detector 1, and rB denotes the optical path length joining the detector 2, the slit B2, the slit B1 and the detector 1.

The formula (7) means that to carry out the coincidence measurement of the photons constituting the entangled photon pairs with the detectors 1 and 2 as a function of the positions of the detectors is equivalent to the observation described below. That is, positional dependence (i.e., an interference pattern) will be obtained which is similar to that obtained in the case where a light source is placed instead of one of the detectors shown in FIG. 1 (for example, detector 2), photons are caused to pass through such a "double slit" that the photons can pass through only the set of the slits A1 and A2 or the set of the slits B1 and B2, and interference effect of the photons by the "double slit" is detected with the other detector (for example, the detector 1).

Figure 2A:
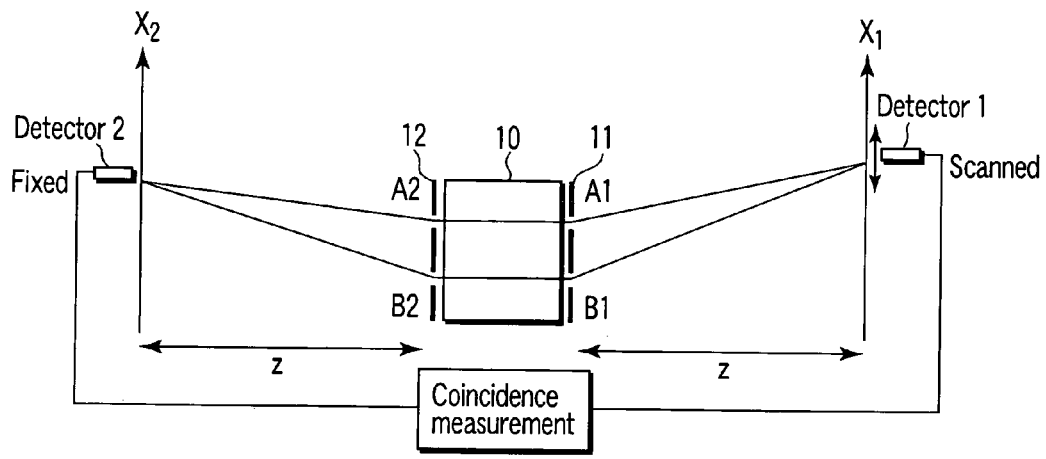
FIGS. 2A and 2B are schematic diagrams illustrating the meaning of coincidence measurement of photon pairs coupled with entanglement in a mechanism of a microscope according to an embodiment of the present invention.
Figure 2B:
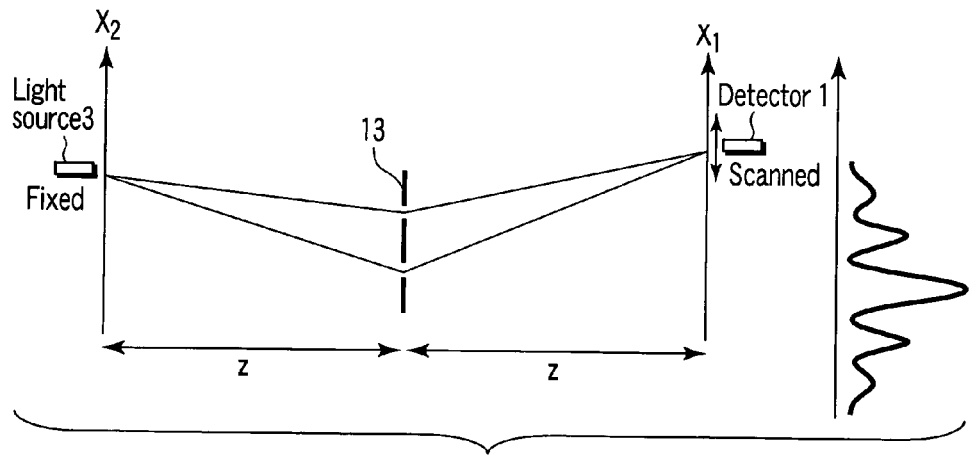

With reference to FIGS. 2A and 2B, the meaning of the coincidence measurement of entangled photon pairs, expressed by the formula (7), will be described in detail.

FIG. 2A shows the case where the coincidence measurements are carried out to observe a two-photon interference pattern under the conditions that the detector 2 is fixed while the position $x_1$ of the detector 1 is scanned in FIG. 1. FIG. 2B shows the case where an interference pattern is observed under the conditions that a light source 3 is fixed, which is arranged instead of the detector 2, while the position of the detector 1 is scanned. These observations are equivalent and thus result in the same interference pattern as that obtained in the ordinary Young's double slit interference experiment in which observation is carried out at a distance Z from a double slit 13 the slits of which are apart from each other by an actual distance between the slits A1 and B1, assumed to be b.

On the other hand, FIG. 3A shows the case where the coincidence measurements are carried out under the conditions that the detector 1 is fixed while the position $x_2$ of the detector 2 is scanned in FIG. 1, and in this case of showing the observation of a two-photon interference pattern, taking into consideration that the above case corresponds to the case where a moving interference pattern is observed under the conditions that the detector 1 is fixed while the position of a light source 3 which is arranged instead of the detector 2 is scanned, as shown in FIG. 3B, it is understood that the same two-photon interference pattern is obtained with the observation shown in FIG. 2A and with the observation shown in FIG. 3A. The consequence that the same results can be obtained is also obvious from the symmetry of the system.

Next, assume that the detectors 1 and 2 are simultaneously scanned under the condition that the coordinates $x_1$ and $x_2$ are retained equally. The light source 3 is arranged instead of the detector 2 and the detector 1 is used for detection as described above. This results an interference pattern which is the same as that obtained when the Young's interference pattern, which moves as the light source 3 moves, is detected by a detector that moves the same distance as the interference pattern in the opposite direction. In this case, the intensity of the coincidence measurements to $x_1$ is half of that for the interference pattern obtained by scanning only the detector 1 (or detector 2) in the direction $x_1$.

In other words, coincidence measurements of the entangled photon pairs each consisting of two photons bring about an interference pattern as if it were observed with beams of half wavelength.

Even if the double slit having the slits A1 and B1 and the double slit having the slits A2 and B2 are replaced with lenses, coincidence measurements of photons bring about an interference (diffraction) pattern contracted at focal positions of the lenses as if the wavelength were reduced to half, for the reason similar to that described above. This means that, provided that sufficiently small detectors can be prepared, the size of the "focal area" detected through the coincidence measurements carried out while the detectors are scanned comes to a half of a diffraction limit determined by the observation wavelength. Moreover, the coincidence measurements of n-numbers of entangled photons bring about 1/n reduction of the interference pattern.

M. D'Angelo et al. has proposed that, by using the above nature, the technique in which n-numbers of entangled photons are focused on the same focal position and the area that has absorbed the n-numbers of photons is changed at high resolution exceeding the diffraction limit, through an absorption process of n-numbers of photons which corresponds to the coincidence measurements of n-numbers of photons, is applied to high-resolution lithography (M. D'Angelo et al., Phys. Rev. Lett., 87(1), 013602(2001)).

In the embodiments of the present invention, the above nature is not used for fine processing using multiphoton absorption, but is used for a microscope to examine fine spatial structures. Now, a method and mechanism for the microscope will be described taking two entangled photons by way of example.

First, with reference to FIGS. 4 and 5, a microscope according to the present invention used in a manner that the focal positions of lenses differ between two entangled photons will be described.

This microscope is applied to the case where there are plural specimens of the same type the fine structure of which is to be determined. Further, in this case, the orientations of fine structure of two specimens 101 and 102 are known. Positions on which two entangled photons are focused are defined as focal positions 1 and 2. The two specimens of the same type are arranged near the respective focal positions. Photon detectors are arranged that observe photons scattered by or transmitted through the specimens at the focal positions. Then, the positions of the specimens 101 and 102 are scanned with respect to the focal positions. Here, directions to which the specimens are scanned are set so that, when certain points fixed to the two specimens 101 and 102 are considered to be the positions of two detectors, a difference in distance corresponding to $(r_A-r_B)$ in the formula (7) changes as large as possible. Orientations of the specimens with respect to the respective scanning directions are set such that the specimens are in a relation that they are rotated around an axis along the scanning direction when the scanning directions are aligned. Scattering or transmission wavelengths differ specifically between two sites 31 and 32, which are to be discriminated in each specimen. Specifically, the wavelength is λ1 for the site 31, and the wavelength is λ2 for the site 32. Further, the two sites 31 and 32 are at a distance L approximately corresponding to the wavelength of the irradiated beam.

Figure 5:
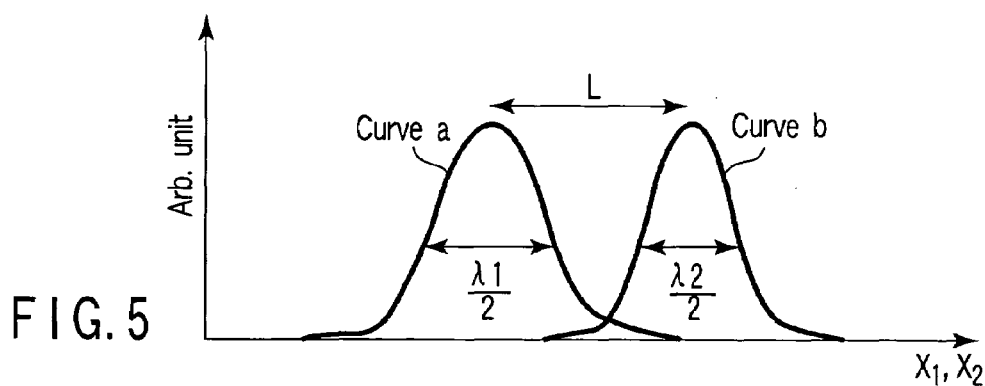
FIG. 5 is a diagram showing observation data obtained using a microscope according to an embodiment of the present invention.

When one of the paired photons with the wavelength λ1 is focused on and applied to each of the specimens 101 and 102 and then the specimens 101 and 102 are scanned, coincidence measurements of photons bring about such a result as the curve a shown in FIG. 5. When one of the paired photons with the wavelength λ2 is focused on and applied to each of the specimens 101 and 102 and then the specimens 101 and 102 are scanned, coincidence measurements of photons bring about such a result as the curve b shown in FIG. 5. These results show that accuracy of position measurement is doubled, so that the structure of the particular sites on the specimen which are at only a distance approximately equal to the observation wavelength can be resolved.

Also in the case of q-numbers of photons coupled with entanglement, where q is an integer equal to or larger than 3, measurements can be carried out at high resolution using a method similar to that described above.

Next, a microscope according to the present invention used in a manner that the focal position of the lens is the same between two entangled photons will be described. In this case, a specimen the structure of which is to be determined is arranged near the focal position. A photon detector is arranged that observes photons scattered by or transmitted through the specimens at the focal position. Then, the position of the specimen is scanned with respect to the focal position. Here, an optical path is set so that, when certain points fixed to the specimen are considered to be the positions of two detectors, a difference in distance corresponding to $(r_A-r_B)$ in the formula (7) changes as large as possible, and the focal positions of the paired entangled photons are matched.

Four methods described below are basically available to detect photons scattered by or transmitted through a specimen with a detector and to count entangled photon pairs. These methods may be combined together.

In a first method, entangled photon pairs generated through parametric down-conversion caused by irradiating a nonlinear crystal with a pump beam, for example, are focused with a lens and applied to a specimen without making an optical path difference between the optical paths of respective photons.

The microscope according to this embodiment comprises: a photon source which sequentially generates sets of quantum-mechanically entangled photons including at least two photons i, where i is an integer between 1 and n, n being an integer equal to or larger than 2; a lens which focuses a set of photons; an actuator which varies a relative distance between a focal position of the lens on which the set of photons are focused and a specimen with a minute displacement, the specimen being arranged near the focal position of the lens; a detector detecting photons transmitted through or scattered by the specimen; and a counter counting coincidence detections of n-numbers of photons with the detector during a gating time which is set so that a rate that a number of photons detected during thereof belong to a single set of quantum-mechanically entangled photons exceeds a predetermined rate depending on the relative distance.

In this case, the entangled photon pairs, which are transmitted through or scattered by particular sites of the specimen, reach the detector at almost the same time. Accordingly, if the gating time $\tau_g$ and the intensity of entangled photon pairs to be irradiated are appropriately adjusted to such a degree that two of photon detecting signals from the detector which have a difference in detection time equal to or shorter than the gating time $\tau_g$ are considered to be detections of entangled photon pairs, it is possible to count photon pairs detected within time intervals of at most $\tau_g$ as entangled photon pairs. It should be noted that a normal detector may output a detection signal corresponding to only one photon, even when two photons are incident on the detector within a certain time $\tau_d$ determined for the detector. It is thus difficult to detect entangled photon pairs reaching the normal detector at almost the same time. Therefore, it is preferable to use as a detector, for example, a visible light photon counter (J. Kim, et al., Appl. Phys. Lett. 74(7), 902(1999)) that can indicate the detection of two photons based on the signal intensity or the like when the two photons are coincidently incident.

A second method uses a plurality of detectors to detect a scattered or transmitted beam. A microscope according to this embodiment comprises: a plurality of detectors detecting the photons transmitted through or scattered by the specimen; and a counter configured to add outputs from the detectors together to count coincidence detections of n-numbers of photons as a sum number of photons detected with the detectors during a gating time which is set so that a rate that the sum number of photons detected during thereof belong to a single set of quantum-mechanically entangled photons exceeds a predetermined rate. By using a time-to-amplitude converter to process detection signals from the plurality of detectors, it is possible to detect photon pairs even if the difference in incidence time is equal to or shorter than $\tau_d$ when photons of entangled photon pairs happen to be incident on different detectors. An increase in the number of detectors increases the probability that photons of photon pairs are incident on different detectors. This makes it possible to increase the efficiency of coincidence measurements.

A third method sets a predetermined delay time for the time of arrival of photons at the detector by, for example, causing two photons constituting an incident photon pair to pass through optical paths with different optical path lengths. In this case, output signals from the detector are processed with a time-to-amplitude converter to count detections of a set of photons whose detection times differs by the delay time as detections of an entangled photon pair.

A microscope according to this embodiment comprises a delay path arranged between the photon source which sequentially generates sets of quantum-mechanically entangled photons including at least two photons i, where i is an integer between 1 and n, n being an integer equal to or larger than 2, and the lens which focuses a set of photons, the delay path being provided so that the photons i reach the focal position of the lens at different times, wherein, assuming that a delay between a time when a first photon of the set of quantum-mechanically entangled photons reaches the focal position and a time when a j-th photon reaches the focal position is defined as $\tau(j)$, where j is an integer between 1 and n, n being an integer equal to or larger than 2, the counter is configured to count detections of n-numbers of photons whose difference between the times that temporally adjacent photons reach the focal position is $\tau(k+1)-\tau(k)$, where k is an integer between 1 and n−1, within a tolerance for time measurement which is set so that a rate that the number of photons detected during thereof belong to a single set of quantum-mechanically entangled photons exceeds a predetermined rate.

In a fourth method, a nonlinear crystal, from which entangled photon pairs are generated, is incorporated in an optical cavity so as to emit paired photons to a cavity mode. The optical cavity causes paired photons i quantum-mechanically coupled with entanglement to reach the focal position of the lens at different times when the paired photons emitted to a cavity mode are taken out of the cavity and focused with the lens. The photon pairs from the cavity have discrete time differences depending on the cavity length. When the light velocity is set to c, the above time difference is an integral multiplication of $2L_c/c$ for a Fabry-Perot cavity and an integral multiplication of $L_c/c$ for a ring cavity, where $L_c$ is a cavity length (H. Goto et al., Phys. Rev. A 68, 015803(2003)). In this method, detections of photons with the time difference are counted as detections of paired entangled photons, as in the case of the third method.

Methods similar to those described above can be used to count q entangled photons, where q is an integer equal to or larger than 3.

EXAMPLE 1

Figure 6:
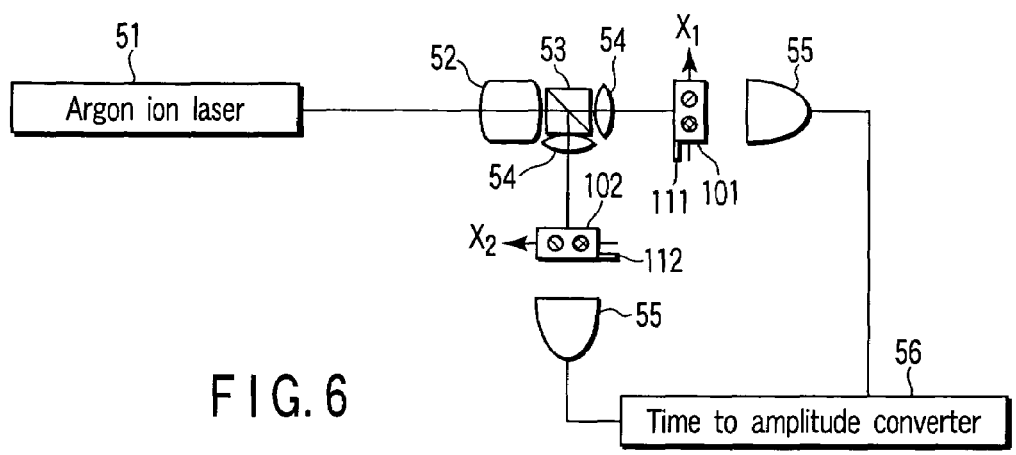
FIG. 6 is a schematic view showing the microscope according to Example 1 of the present invention.

With reference to FIG. 6, a microscope according to the present example will be described. In the present example, entangled photon pairs are generated by irradiating a β-barium borate (BBO) crystal 52 (type-II) with a thickness of about 5 mm with a pump beam of about 10 mW from the argon ion laser 51. The BBO crystal 52 is rotatable. The BBO crystal 52 is able to generate a photon pair of 916 nm when a pump beam of 458 nm is incident on the crystal, and to generate a photon pair of 702 nm when pump beam of 351 nm is incident on the crystal, with maintaining phase matching, respectively. The input and output surfaces of the crystal are polished into a cylindrical shape by which photon pairs exiting the crystal have the same exiting point and direction whether the wavelength thereof is 916 nm or 702 nm.

A small polarized beam splitter 53 is arranged on the photon pair output side of the BBO crystal 52. Achromatic lenses 54, 54 arranged adjacent to the output sides of the beam splitter 53 focus photons of split signal beam and idler beam, respectively. Specimens 101 and 102 are placed at the respective focal points. The positions of the specimens can be varied with a minute displacement using piezoelectric elements 111 and 112, respectively. The positions of the specimens 101 and 102 are scanned in the directions of coordinate axes $x_1$ and $x_2$ shown by arrows in the figure. Avalanche photodiodes 55, 55 are arranged to detect photons passing through the specimens 101 and 102. Output signals from the avalanche photodiodes 55, 55 are input to a time-to-amplitude converter 56.

Figure 7:
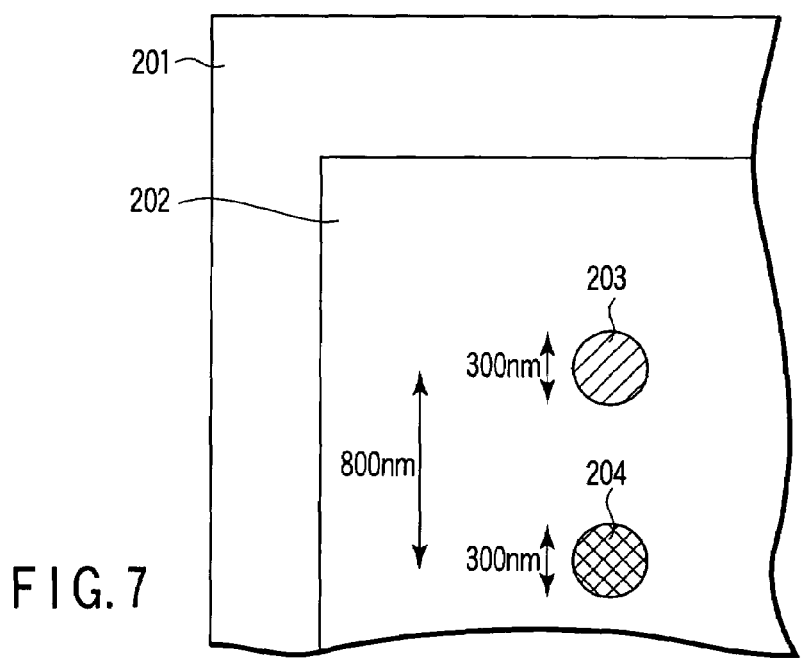
FIG. 7 is a plan view showing the structure of the specimen used in Example 1 of the present invention.

FIG. 7 shows the structure of the specimen. The specimen includes a quartz substrate 201 and an aluminum film 202 with a thickness of 100 nm deposited on the quartz substrate 201 in which two holes each having a diameter of 300 nm are formed with a distance of 800 nm apart from each other between the centers thereof. One of the holes is filled with an absorbent 203 which allows light of 916 nm to mostly pass through and absorbs light of 702 nm. The other hole is filled with an absorbent 204 which allows light of 702 nm to mostly pass through and absorbs light of 916 nm.

Two specimens with a structure shown in FIG. 7 are prepared. The specimen 101 is arranged at the focal position of the signal beam, and the specimen 102 is arranged at the focal position of the idler beam, respectively. The orientations of the specimens 101 and 102 are set so that the direction of the vector that starts at the absorbent 204 and ends at the absorbent 203 is consistent with the direction to which each of the specimens 101 and 102 is scanned.

Figure 8:
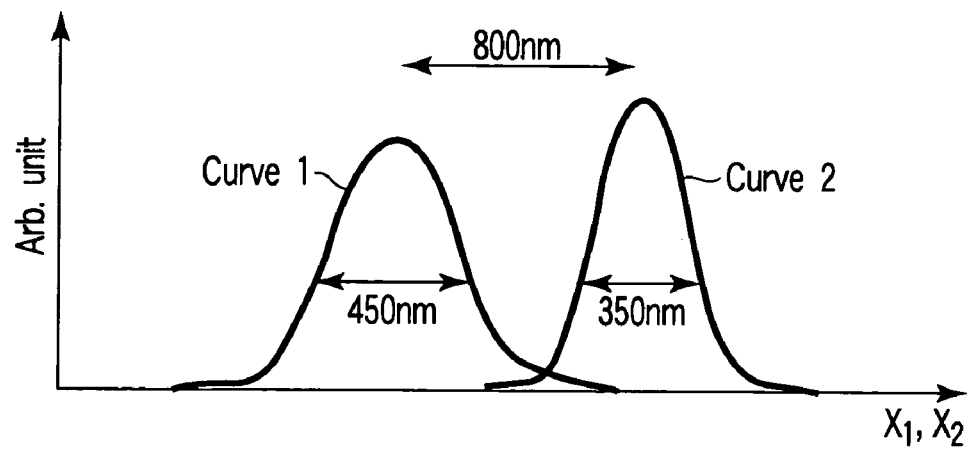
FIG. 8 is a diagram showing observation data obtained using the microscope according to Example 1 of the present invention.

In the apparatus assembled as above, the specimens 101 and 102 are scanned so that their coordinates $x_1(t)$ and $x_2(t)$ meet the condition that $x_1(t)=x_2(t)$, while being irradiated with a photon pair of 916 nm. Coincidence measurements of photons as a function of the positions of the specimens are carried out by using the two avalanche photodiodes 55, 55. When the gating time is set at 100 ns between −50 to +50 ns, such a data as shown by the curve 1 in FIG. 8 is obtained. The data means that the microscope can detect the position of the absorbent (i.e., the hole) at about half the wavelength limit.

Next, the specimens are irradiated with a photon pair of 702 nm and similar measurements are carried out. Then, such a data as shown by the curve 2 in FIG. 8 is obtained.

These data indicate that the microscope can resolve a fine structure beyond the wavelength limit.

EXAMPLE 2

Figure 9:
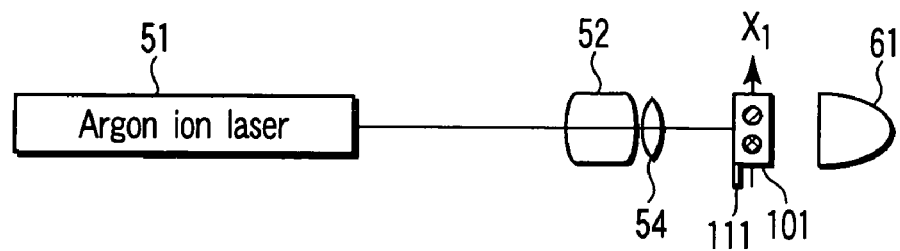
FIG. 9 is a schematic view showing the microscope according to Example 2 of the present invention.

With reference to FIG. 9, a microscope according to the present example will be described. The present example uses the photon source including the argon ion laser 51 and the BBO crystal 52 similarly to Example 1. However, no beam splitter is arranged on the output side of the crystal, and the achromatic lens 54 is arranged near the crystal 52. The specimen 101 same as the one used in Example 1 is arranged at the focal point of the achromatic lens 54. The position of the specimen is varied with a minute displacement using the piezoelectric element 111. The position of the specimen 101 was scanned in the direction $x_1$ shown by the arrow in the figure.

To detect photons transmitted through the specimen 101, a visible light photon counter 61 that can discriminate the coincident detection of two photons from the detection of one photon is used. If two photons are coincidently incident on the detector 61, an output voltage is about twice that obtained when one photon is incident on the detector 61. Thus, the incidence of two photons can be discriminated from the incidence of one photon.

The orientation of the specimen 101 is set so that the direction of the vector that starts at the absorbent 204 and ends at the absorbent 203 is consistent with the direction to which the specimens 101 is scanned. First, the specimen 101 is scanned in the direction of $x_1$ coordinate while being irradiated with photon pairs of 916 nm. Coincidence measurements are carried out by counting outputs, from the visible light photon counter 61, of coincident detections of two photons as a function of the position of the specimen. In this case, such a data such as shown by the curve 1 in FIG. 8 is obtained. Next, the specimen is irradiated with photon pairs of 702 nm and similar measurements are carried out. In this case, such a data as shown by the curve 2 in FIG. 8 is obtained.

These data indicate that the microscope can resolve a fine structure beyond the wavelength limit.

EXAMPLE 3

As shown in FIG. 10, the visible light photon counter 61 in FIG. 9 is replaced with five avalanche photodiodes 55, and the outputs from the avalanche photodiodes are input to the time-to-amplitude converter. Coincidence measurements are carried out under a gating time of 100 ns between −50 and 50 ns while irradiating the specimen with photon pairs generated by pumping with the 10-mW argon ion laser. Measurements are carried out using photon pairs of 916 nm and 702 nm as in Example 2. Thus, such data as shown in FIG. 8 are obtained, which indicates that the microscope can resolve a fine structure beyond the wavelength limit.

EXAMPLE 4

As shown in FIG. 11, a small polarized beam splitter 53 is arranged on the photon output side of the BBO crystal 52 in FIG. 9 to split the signal beam and the idler beam. A 60-cm delay path 71 which is formed by two mirrors 72 and 73 is provided in the optical path of the idler beam reflected by the polarized beam splitter 53. The idler beam is passed through the delay path 71 and then combined with the signal beam again by another polarized beam splitter 53'. Further, avalanche photodiode 55 are arranged in place of the visible light photon counter 61. Outputs from the avalanche photodiode 55 are input to the time-to-amplitude converter 56. Then, entangled photon pairs are measured by counting detections of photons whose detection times have a difference of 2 ns. The other procedures are similar to those in Example 2. Thus, such data as shown in FIG. 8 are obtained, which indicates that the microscope can resolve a fine structure beyond the wavelength limit.

EXAMPLE 5

As shown in FIG. 12, a Fabry-Perot cavity 81 with a cavity length of 30 cm is provided in place of the polarized beam splitter 53 and the delay path 71 in FIG. 11. The BBO crystal 52 is installed in the Fabry-Perot cavity 71. The cavity length was finely adjusted using a piezoelectric element so that the photon pairs are resonant with the cavity mode, in both cases of generating photon pairs of 916 nm and 702 nm by pumping with the argon ion laser.

Measurements similar to those in Example 4 are carried out using photon pairs generated from the BBO crystal 52 in the cavity 81 and emerged out of the cavity 81. Thus, such data as shown in FIG. 8 are obtained, which indicates that the microscope can resolve a fine structure beyond the wavelength limit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope using quantum-mechanically entangled photons comprising:
   a photon source which sequentially generates sets of quantum-mechanically entangled photons including at least two photons;
   a splitter splitting the quantum-mechanically entangled photons into individual photons traveling in different directions;
   lenses which focus the individual photons, respectively;
   actuators which vary relative distances between focal positions of the respective lenses on which the individual photons are focused and specimens having a same structure with a displacement, respectively, the specimens being arranged near the focal positions of the respective lenses;
   detectors detecting a photon transmitted through or scattered by the specimens, respectively; and
   a counter counting coincidence detections of the photons with the detectors depending on the varied relative distances.

2. The microscope according to claim 1, wherein photons with photon energies specifically absorbed or scattered by a site of the specimen are detected.

3. The microscope according to claim 1, wherein photons with photon energies specifically absorbed or scattered by plural sites of the specimen, respectively, are detected.

4. The microscope according to claim 1, wherein the photon source is configured to sequentially generate sets of quantum-mechanically entangled photons with respect to plural wavelengths, and wherein the counter is configured to count coincident detections of photons with the detector with respect to the plural wavelengths depending on the relative distance.

5. The microscope according to claim 1, wherein the photon source comprises a nonlinear crystal pumped by a laser beam.

6. The microscope according to claim 1, wherein the splitter is a polarized beam splitter.

7. The microscope according to claim 1, wherein the counter comprises a time-to-amplitude converter.

8. A microscope using quantum-mechanically entangled photons comprising:
   a photon source which sequentially generates sets of quantum-mechanically entangled photons including at least two photons;
   a lens which focuses a set of photons;
   an actuator which varies a relative distance between a focal position of the lens on which the set of photons are focused and a specimen with a displacement, the specimen being arranged near the focal position of the lens;
   a detector detecting photons transmitted through or scattered by the specimen; and
   a counter counting coincidence detections of photons with the detector during a gating time which is set so that a rate that a number of photons detected during thereof belong to a single set of quantum-mechanically entangled photons exceeds a predetermined rate depending on the varied relative distance.

9. The microscope according to claim 8, comprising a plurality of detectors detecting the photons transmitted through or scattered by the specimen,
   wherein the counter configured to add outputs from the detectors together to count coincidence detections of n-numbers of photons as a sum number of photons detected with the detectors during a gating time which is set so that a rate that the sum number of photons detected during thereof belong to a single set of quantum-mechanically entangled photons exceeds a predetermined rate.

10. The microscope according to claim 8, further comprising a delay path arranged between the photon source and the lens which focuses a set of photons, the delay path being provided so that the photons reach the focal position of the lens at different times,
    wherein, assuming that a delay between a time when a first photon of the set of quantum-mechanically entangled photons reaches the focal position and a time when a j-th photon reaches the focal position is defined as $\tau(j)$, where j is an integer from 1 to n, n being an integer equal to or larger than 2, the counter is configured to count detections of n-numbers of photons whose difference between the times that temporally adjacent photons reach the focal position is $\tau(k+1)-\tau(k)$, where k is an integer from 1 to n−1, within a tolerance for time measurement which is set so that a rate that the number of photons detected during thereof belong to a single set of quantum-mechanically entangled photons exceeds a predetermined rate.

11. The microscope according to claim 10, wherein an optical cavity incorporating the photon source which sequentially generates sets of photon pairs each including two quantum-mechanically entangled photons is provided in place of the delay path, the optical cavity being configured to cause paired photons to reach the focal position of the lens at different times when the paired photons emitted to a cavity mode are taken out of the cavity and focused with the lens.

12. The microscope according to claim 8, wherein photons with photon energies specifically absorbed or scattered by a site of the specimen are detected.

13. The microscope according to claim 8, wherein photons with photon energies specifically absorbed or scattered by plural sites of the specimen, respectively, are detected.

14. The microscope according to claim 8, wherein the photon source is configured to sequentially generate sets of quantum-mechanically entangled photons with respect to plural wavelengths, and wherein the counter is configured to count coincident detections of photons with the detector with respect to the plural wavelengths depending on the relative distance.

15. The microscope according to claim 8, wherein the photon source comprises a nonlinear crystal pumped by a laser beam.

16. The microscope according to claim 8, wherein the counter comprises a time-to-amplitude converter.

17. The microscope according to claim 8, wherein a visible light photon counter is used for the detector and the counter.

* * * * *